Figure 1:
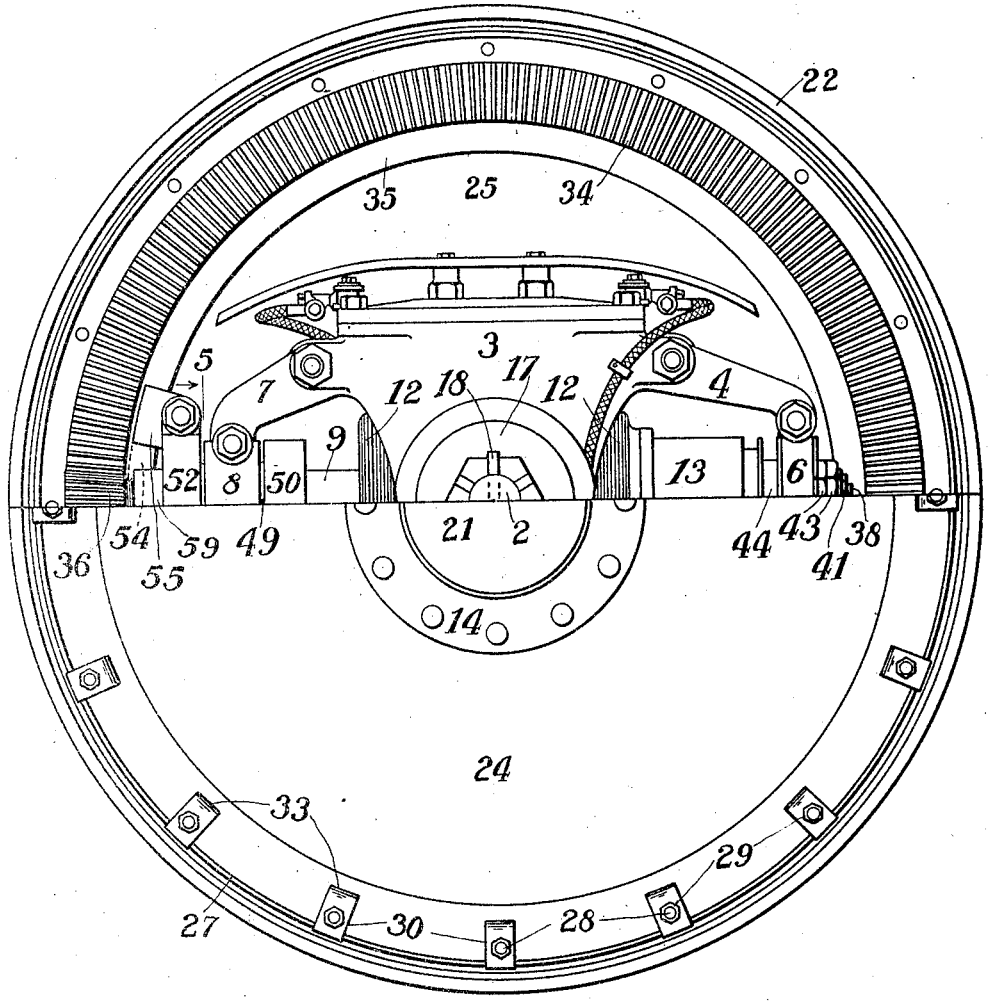

K. KNUDSEN.
ELECTRIC MOTOR WHEEL.
APPLICATION FILED MAY 24, 1912.
1,079,917.
Patented Nov. 25, 1913.
2 SHEETS—SHEET 2.
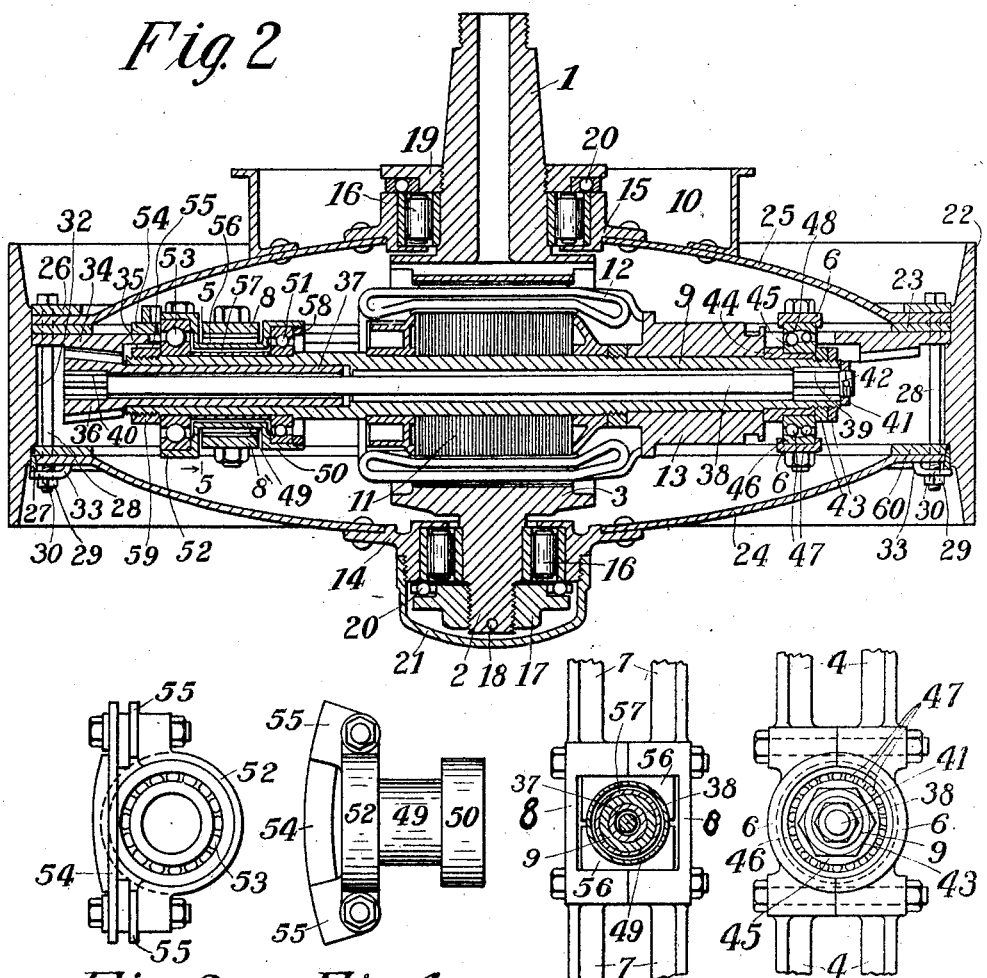
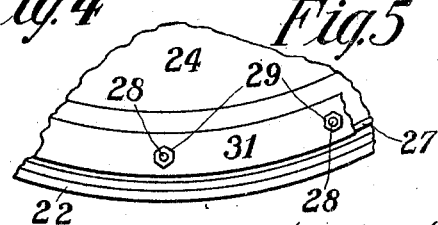
WITNESSES:
J. D. Long
G. A. Angier
INVENTOR.
Karsten Knudsen
BY
Webster & Co
ATTORNEYS.

UNITED STATES PATENT OFFICE.

KARSTEN KNUDSEN, OF GRAND RAPIDS, MICHIGAN, ASSIGNOR, BY DIRECT AND MESNE ASSIGNMENTS, TO ELECTRIC WHEEL CO., (ASSOCIATES,) OF SPRINGFIELD, MASSACHUSETTS.

ELECTRIC MOTOR-WHEEL.

1,079,917.  Specification of Letters Patent.  Patented Nov. 25, 1913.

Application filed May 24, 1912. Serial No. 699,583.

*To all whom it may concern:*

Be it known that I, KARSTEN KNUDSEN, a citizen of the United States of America, residing at Grand Rapids, in the county of Kent and State of Michigan, have invented certain new and useful Improvements in Electric Motor-Wheels, of which the following is a specification.

My invention relates to improvements in mechanism for transmitting power from rotary driving shafts to wheels, and is especially applicable to electrically driven wheels for trucks or other vehicles, in which the motors are contained within such wheels, being shown in such connection, but it is also applicable to other forms of wheels used for other purposes.

My improved electric motor wheel consists of suitable axial housings and of electric motor elements, a certain peculiar wheel structure, and what may be termed flexible driving mechanism for the single annular rack which I employ and which is the member of the wheel structure that receives the power from the motor, such mechanism including a so-called floating-shaft provided with a single pinion to mesh with said rack, and so arranged that it has or may have a vibratory or oscillatory movement, which movement although slight is sufficient to enable said floating-shaft with its pinion to adjust itself at all times to any irregularity in the rack, all as hereinafter set forth.

Owing to the fact that annular racks of the size required in motor wheels of the class noted above are seldom if ever absolutely true and regular, and that as a result of the irregularities therein there is a tendency on the part of such racks and their driving pinions to bind, so that these members together with the pinion shafts and the bearings therefor are subjected to undue wear and strain, and not infrequently some of the parts are broken, and one object of my invention is to overcome or eliminate these defects, and so materially to add to or increase the successful operation and enhance the value of motor wheels having my novel mechanism incorporated therewith or therein.

In this mechanism the torsional stress is on the floating-shaft so that the driving pinion only has to bear the transverse stress. The pinion thus being relieved of much of the strain that it would otherwise be subjected to, is able to do more work and lasts longer than under the old conditions which failed to make any provision for lost motion between pinion and rack or for the former to accommodate itself to the latter. To this division or distribution of the torsional and transverse stresses is largely due the great decrease in the liability of breakage incident to the driving mechanism, such liability as a matter of fact being reduced to the minimum.

In mechanism of the nature to which this invention relates, if the driving member or pinion have a rigid connection with the armature body, it is necessary that the gearing be absolutely perfect in order that the driving member and the driven member shall revolve with uniform velocity, because, as can be mathematically proven, a very slight imperfection in the engaging parts of such gearing produces an angular vibration of the two revolving members, with such an amplitude of impact between said engaging parts, especially where high speed armatures are involved, that the proper operation designated as smooth running of said gearing is seriously interfered with and greatly impaired and the life of the gearing materially shortened.

In the present case the angular vibration above referred to is largely if not wholly absorbed by the long torsion shaft, since the kinetic energy of such shaft, in comparison to that of the armature, is insignificant; and the very slight torsional angle that would be required fully to compensate for any imperfection in the gearing is to a large extent taken care of by an impact between the meshing teeth of such a small amplitude as to be entirely harmless.

A further object is to produce a motor wheel so constructed that the entire interior thereof becomes accessible upon the removal of the front cover plate without disturbing any of the mechanism, and incidental to this feature are simple but secure and easily manipulated attaching means for such plate.

Other objects and advantages will appear in the course of the following description.

A preferred form of embodiment of the invention, whereby I attain the objects and secure the advantages of the same, is illustrated in the accompanying drawings, and I will proceed to describe the invention with reference to said drawings, although it is to be understood that the form, construction, arrangement, etc., of the parts in various aspects are not material and may be modified without departure from the spirit of the invention.

In the drawings, in which like numerals designate like parts throughout the several views, Figure 1 is a front elevation of an electric motor wheel which embodies my invention as aforesaid, the upper half of the cover plate with its fastening means being omitted so as to disclose the interior mechanism or so much thereof as is discernible without sectioning; Fig. 2, a central horizontal section through said wheel; Fig. 3, a left hand end elevation of the movable bearing-guide sleeve for the armature shaft; Fig. 4, a front elevation of said sleeve; Fig. 5, a cross-section taken on line 5, in Fig. 1, and on lines 5—5, in Fig. 2, looking in the direction of the associated arrows, and showing the support and movable bearing for said sleeve; Fig. 6, a right-hand end elevation of the armature shaft and of the floating-shaft with the bearing for said armature shaft at that end and the support for said bearing, and, Fig. 7, a fragment of the casing showing a slightly modified form of the fastening means for the cover plate.

As illustrated in connection herewith my wheel and its appurtenances are described in detail as follows: In the center of the wheel is an axle comprising an axle sleeve 1 behind, a projection 2 in front, and a field frame 3 between said axle sleeve and said projection. The field magnets (not shown) are contained in the upper and under portions of the field frame 3 and are accessible upon the removal of the front sides of such portions. These elements are old and well known, as are also the means for mounting the wheel hubs on the axle and the other motor elements mentioned below, so that no extended description of either the construction or operation of the old parts, members and elements is necessary to a clear understanding of the present invention, which latter does not depend for its novelty upon the parts, members and elements just referred to.

From each of the upper and under portions or sections of the field frame 3 at the hight-hand end extends outwardly a pair of arms 4, these four arms being provided at their outer ends with a pair of ball-case bearing-box sections 6; while from each of the aforesaid upper and under portions or sections at the left-hand end extends outwardly a pair of arms 7, these four arms being provided at their outer ends with a pair of bearing-box sections 8. The boxes made up of the two pairs of sections 6 and 8 constitute fixed and stable supporting means for an armature shaft 9. The manner in which the shaft 9 is journaled in these bearing boxes will presently be explained.

A rotary armature 11 having a winding coil 12 is secured on the central portion of the shaft 9 within the magnet field, and on said shaft at the right of said armature is a commutator 13. The brushes are not represented.

At 14 and 15 respectively appear front and back wheel hubs, and these are respectively mounted to revolve on the axle projection 2 and sleeve 1, roller-bearings 16 being interposed as is customary. The hub 14 and the roller-bearing 16 therefor are held against axial movement between a shoulder on the projection 2 and a nut 17 screwed on to said projection at its front end and secured by a pin 18, and the hub 15 and the roller-bearing 16 therefor are held against axial movement between a shouldered part of the sleeve 1 and a nut 19 screwed on to said sleeve. Ball-bearings 20 are introduced between the nuts 17 and 19 and the contiguous parts. The front end of the projection 2 and the members mounted thereon are concealed by a screw-cap 21 on the hub 14. The wheel proper comprises the hubs 14 and 15, a rim 22, front and back plates 24 and 25, the former being the cover plate, having open centers the edges of which are rigidly attached to said hubs, respectively, a front lock-ring 27, and a series of bolts 28, nuts 29, and clamps 30, or in place of the latter a single clamp in the form of a ring 31, the former appearing in Figs. 1 and 2 and the latter in Fig. 7. The peripheral edge portion of the plate 24 is reinforced by means of an inside ring 60 riveted thereto, and the corresponding portion of the plate 25 is reinforced by means of inside and outside rings 23 and 26, respectively, riveted thereto. The bolts 28 pass through the ring 26, the plate 25, the rings 23 and 60, and the plate 24, and receive on their front terminals the clamps 30 (or the clamp ring 31) and the nuts 29. The lock-ring 27 is wedge-shaped in cross-section and fits the space between the outer edges of the plate 24 and its ring 60 and adjacent portions of the rim 22. The lock-ring when forced into the aforesaid space not only becomes wedged therein but in turn wedges the plate 24 in place. The clamps 30 are especially adapted both to force the lock-ring to its seat and thus to assist in securing the cover plate and to serve in the capacity of direct fastening agents, when the nuts 29 are tightened on the bolts 28 against said clamps, because each clamp has a rearwardly-projecting part 33 at one end which bears on said plate while said clamp bears at the other end on the exposed wide edge of said lock-ring. In cross-section the clamp ring 31 is constructed similarly to the clamps 30, so that if such ring were cut transversely into sections each of such sections would form one of said clamps 30, and said ring functions in practically the same way as do said clamps. On the back side of the plate 25 is a brake-flange 10. An annular rack 34 provided with an interior guide flange 35 is secured against the inside of the ring 23, and the bolts 28 pass through such rack. The wheel rim 22 has an internal flange 32 and by means of the bolts, nuts and other fastening members the plates 24 and 25 and attached members are clamped to said flange, the outer edge portion of the rack 34 and the outer edge portion of the ring 60 coming in direct contact with the edges of said flange.

Through the medium of the rack 34 the wheel is driven from the motor by means of a pinion 36 at the outer end of a hollow spindle 37. The armature shaft 9 is hollow and both spindle 37 and a floating-shaft 38 are contained within said armature shaft, but the driving pinion 36 is beyond the left-hand end of said last-mentioned shaft. The floating-shaft 38 is out of contact for the greater part of its length with the armature shaft 9, but is keyed thereto at 39, such connection being at the right-hand terminals of said shafts; and the spindle 37 is out of contact throughout its entire length with the floating-shaft, but fits easily the armature shaft. The pinion 36 is keyed to the floating-shaft at the left-hand terminal of the same, as represented at 40. Thus it will be seen that synchronous movement is transmitted from the armature shaft to the pinion through the floating-shaft. The splines 40 and the pinion 36 at one end and the splines 39 and a nut 41 at the other end hold the floating-shaft 38 against endwise movement, hence said pinion cannot move axially. The nut 41 is screwed on to the right-hand end of the floating-shaft 38 which protrudes from the corresponding end of the armature shaft 9, and said nut may be secured by a pin 42.

I will next describe the bearings for the armature shaft 9, which bearings are flexible, so to speak, in order to enable the driving members for the rack 34 to vibrate or oscillate to whatever extent may be required to meet and adjust themselves automatically to any irregularities in said rack.

Two nuts 43 are threaded to the right-hand terminal of the shaft 9, and mounted on said shaft between the commutator 13 and the inner nut 43 is a flanged collar 44. Thus an annular recess is formed between the flange on the collar 44 and the inner nut 43, and in this recess, which opens into the space within the box sections 6, is received the inner member 45 of a ball-case. The outer member 46 of said ball-case is in the box sections 6 which are channeled to receive it. There are two sets of balls 47 in the ball-case thus formed and located. The exterior ball-case member 46 has an arcuate inner bearing surface for the balls 47, as represented at 48, in Fig. 2, so as to enable the shaft 9 to be oscillated freely. Provision is thus made in this anti-friction bearing for whatever oscillatory movement may be required on the part of the shaft 9 at this end, since no matter in what direction the left-hand end of said shaft may be moved from the normal axial center, the right-hand end of said shaft is still supported and unaffected, provided, of course, that such movement be within reasonable limits as to degree. As a matter of fact, however, the oscillatory movement is on a horizontal plane in the present case, and never on any other nor is the movement of the armature shaft ever gyratory, which will be made plain hereinafter. The inner set of balls 47 may be larger than the outer set, if desired, for the purpose of assisting the other bearing or journal members in resisting end thrust toward the left, the only direction in which the same occurs. Passing now to the other journal for the shaft 9, I wish first to call attention to a sleeve 49 which has a hub 50 at the right-hand end for a ball-bearing 51 for said shaft 9, and a hub 52 at the left-hand end for a ball-bearing 53 also for said shaft, and is provided at the left-hand end with a rear guide flange 54 and with two front guide flanges 55. The sleeve 49 is supported within the box sections 8 by and between a pair of horizontal bearing blocks 56 which bear at the top and bottom on said box sections, but do not fill the space within said sections transversely; hence said blocks can move laterally with said sleeve, the space between the hubs 50 and 52 within which said sections are received being wide enough to permit of the movement just mentioned. The sleeve 49 is so located by the box sections 8 as to position the flange 54 in contiguity with the back side of the rack flange 35 and the flanges 55 in contiguity with the front side of said rack flange, the spaces between said flange 34 and said flanges 55, which latter are in the same vertical plane, being approximately equal to the thickness of said flange 35 which revolves through such spaces.

It will be observed that the sleeve 49 together with its support is an important element of the invention, because said sleeve is the medium which causes the pinion 36 to move forward and backward out of the normal axial center of said pinion as irregular, warped or distorted portions of the rack 34 which is driven by said pinion are actuated past the same, or, in other words, to follow the irregularities of or in said rack, which are either in advance of or behind the normal vertical plane of the front face thereof, and this without increasing or diminishing the distance between the pinion axis and the rack ring or altering the relation between pinion and rack so as to interfere with the meshing teeth or change their relationship, such result being due to the construction wherein provision is made always to maintain the rack flange at a point adjacent to the pinion within the embrace of the sleeve flanges.

In the present arrangement there is a separator sleeve 57 on the shaft 9 between the inner ball-case members of the ball-bearings 51 and 53, a ring 58 screwed into the hub 50 outside of the ball-bearing therein, and a nut 59 screwed on to said shaft at the left of the inner ball-case member of the ball-bearing 53. The inner ball-case members of the ball-bearings 51 and 53 are held against axial movement by and between a shoulder on the shaft 9 at the right, the sleeve 57 and the nut 59, while the outer ball-case member of the ball-bearing 51 is held against axial movement by and between the ring 58 and the inner end of the hub 50, and the outer ball-case member of the ball-bearing 53 abuts the inner end of the hub 52. Endwise movement of the armature shaft and parts carried thereby, especially toward the left which is the only direction that such shaft and parts have a tendency to take, as previously noted, is prevented by these restraining members and those at the right-hand terminal of said shaft.

In practice the wheel is driven by the motor, through the medium of the herein described intervening parts and members, in very much the same way as in other cases where a similar type of motor is employed and the wheel is equipped with a single rack and pinion, but owing to the presence of the movable bearings for the armature shaft and driving pinion members, whereby such shaft and members are rendered vibratory or oscillatory, the pinion maintains the normal relationship with the rack at all times, wherefore the action of the driving mechanism is greatly improved, the life of the same is prolonged, there is little or no danger of the teeth becoming broken, and other advantages are derived. As the armature shaft 9 travels back and forth with the sleeve 49 and the blocks 56 in the box sections 8, it fulcrums on or in the ball-bearing at the right-hand terminal of said shaft, as has already been made clear. The oscillatory movement of the shaft 9 and the armature thereon is so slight, of course, as not to interfere with the proper working of the motor.

To gain access to the interior of the wheel, it is simply necessary to take off the screw-cap 21 and the nut 17, remove the nuts 29 and the clamps 30 (or clamp 31), withdraw the lock ring 27, and slip the plate 24 off of the bolts 28 and the hub 14 off of the axle projection 2, all of which can be done readily and without disturbing any of the internal mechanism. The same parts and members can be returned to place as readily as they were disconnected and taken off or removed.

What I claim as my invention, and desire to secure by Letters Patent, is—

1. The combination, with an oscillatory driving member, and a driven member, both of said members being in constant engagement and their revolutions relatively being constant in direction, of connecting means between said driving member and said driven member, whereby the former follows any irregularity in the latter.

2. The combination, with an annular rack, of a shaft, a movable bearing for said shaft at one terminal, a pinion secured to said shaft at the other terminal, said pinion being in mesh with said rack, a movable bearing for said shaft adjacent to said pinion, and connecting means between said bearing and said rack, whereby said shaft is caused to follow any irregularity in said rack and said pinion is maintained in constant normal relation to said rack.

3. The combination, with an annular rack, of an oscillatory shaft, a pinion on such shaft to mesh with said rack, movable bearings for said shaft, and connecting means between one of said movable bearings and said rack, whereby said shaft is caused to follow any irregularity in said rack and the normal relationship between said pinion and rack is maintained.

4. The combination, with an annular rack, of an oscillatory shaft, a pinion on one terminal of such shaft to mesh with said rack, an oscillatory bearing for said shaft at the other terminal, a sliding bearing for said shaft adjacent to said pinion, and connecting means between said sliding bearing and said rack, whereby said shaft is caused to follow any irregularity in said rack and the normal relationship between said pinion and rack is maintained.

5. The combination, with an annular rack, of a hollow shaft journaled for oscillatory movement, a pinion carried by said shaft in mesh with said rack, a floating-shaft within said hollow shaft, said floating-shaft being secured at one end to said hollow shaft and being provided at the other end with means to drive said pinion, and connecting means between said shafts and said rack, whereby the former follow any irregularity in the latter and the normal relationship between said pinion and rack is maintained.

6. The combination, with an annular rack, of a hollow shaft journaled for oscillatory movement, a floating-shaft within said hollow shaft and secured thereto at one end, a hollow spindle also within said hollow shaft but outside of said floating-shaft, a pinion on such hollow spindle to mesh with said rack, said spindle and pinion being secured to said floating-shaft, and connecting means between said shafts and said rack, whereby the former follow any irregularity in the latter and the normal relationship between said pinion and rack is maintained.

7. The combination, in an electric motor wheel, with a stationary support provided with a bearing, a second stationary support provided with a sliding bearing, such sliding bearing having guide means, an armature shaft mounted in said bearings, and a pinion on such armature shaft of an annular rack in mesh with said pinion, said rack having guide means arranged to engage as it is revolved by said pinion said first-mentioned guide means, and so to move said sliding bearing with said shaft and accommodate said pinion to any irregularity in said rack.

8. The combination, in an electric motor wheel, with a bearing support, a second support, a sleeve slidably mounted in said second support and provided with hubs and with guide means, anti-friction bearings in said hubs, an armature shaft mounted in said bearings, with one terminal in said first-mentioned support, and a pinion at the other terminal of such armature shaft, of an annular rack in mesh with said pinion, said rack having guide means arranged to engage as it is revolved by said pinion said first-mentioned guide means, and so to move said sleeve with said shaft and accommodate said pinion to any irregularity in said rack.

9. The combination, in an electric motor wheel, with an armature shaft, a pinion on such shaft, a movable bearing for such shaft, a stationary support, and a sleeve bearing for such shaft slidingly mounted in such support and provided with rack-flange-engaging means, of an annular rack to mesh with said pinion and provided with a guide member in engagement with said rack-flange-engaging means, whereby the pinion and rack are maintained in normal relation to each other regardless of any irregularity in the rack.

10. The combination, in an electric motor wheel, within an armature shaft, a pinion on such shaft, a floating-shaft within said armature shaft and provided with means to drive said pinion, a movable bearing for said armature shaft, a stationary support, and a sleeve bearing for said armature shaft slidingly mounted in such support and provided with rack-flange-engaging means, of an annular rack meshing with said pinion and provided with a guide member in engagement with said rack-flange-engaging means, whereby the pinion and rack are maintained in normal relationship regardless of any irregularity in the rack.

11. The combination, with an annular rack, of a hollow armature shaft, a pinion in mesh with said rack, and oscillatory driving means between said hollow shaft and said pinion, whereby the instantaneous blows on the teeth of said rack and pinion are reduced.

KARSTEN KNUDSEN.

Witnesses:
AGNES KNUDSEN,
H. BJONE.